(No Model.)
C. FORSCHNER.
SCALE PAN FOR BALANCES.
No. 302,990. Patented Aug. 5, 1884.
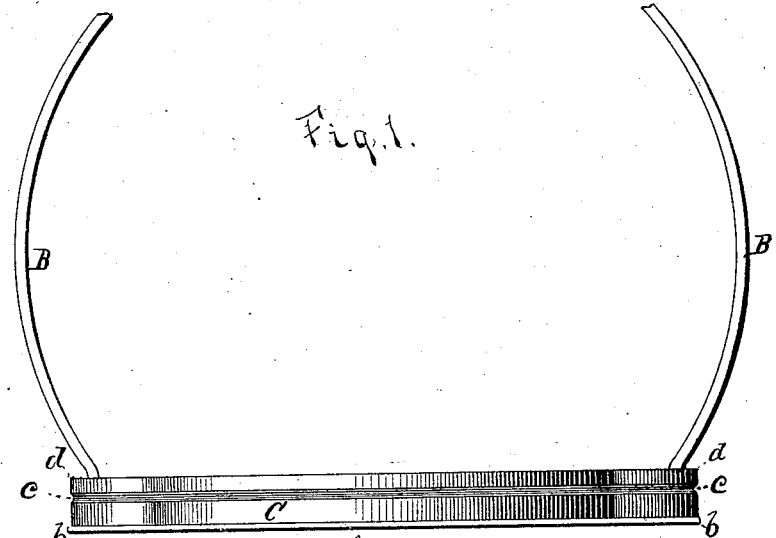
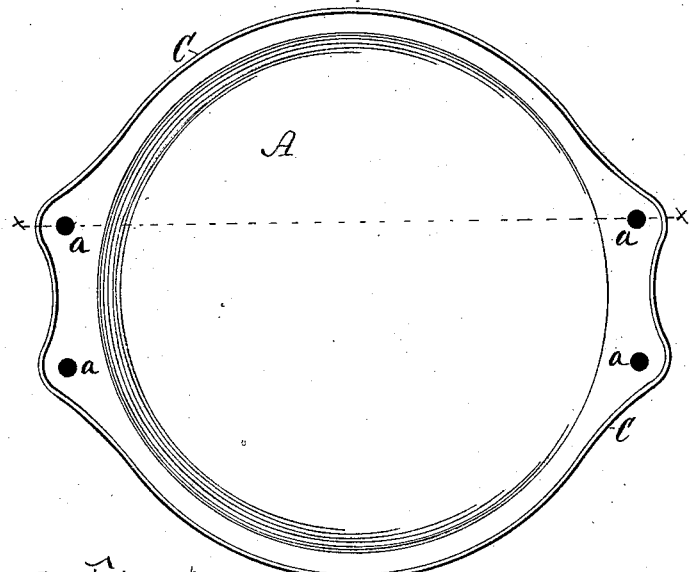
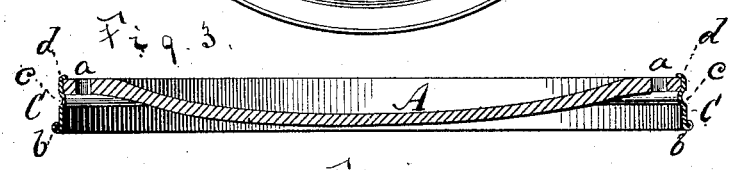
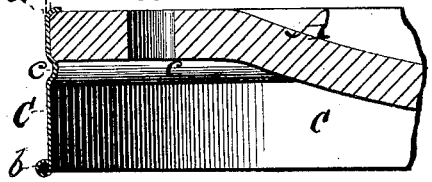
WITNESSES:
R. A. Clark
M. E. Fowler
INVENTOR,
Charles Forschner,
By his attorney,
J. S. Brown.

UNITED STATES PATENT OFFICE.

CHARLES FORSCHNER, OF NEW YORK, N. Y.

SCALE-PAN FOR BALANCES.

SPECIFICATION forming part of Letters Patent No. 302,990, dated August 5, 1884.

Application filed April 14, 1884. (No model.)

*To all whom it may concern:*

Be it known that I, CHARLES FORSCHNER, of New York, in the county of New York and State of New York, have invented an Improvement in Scale-Pans for Balances; and I do hereby declare that the following is a full and exact description thereof, reference being had to the accompanying drawings, making part of this specification—

Figure 1 being a side view of a spring-scales pan with the bail thereof attached and provided with my improvement; Fig. 2, a top view of the scales-pan without the bail and provided with my improvement; Fig. 3, a vertical section of the same in a plane indicated by the line $x\ x$, Fig. 2; Fig. 4, a vertical section of one edge thereof on a larger scale than the other figures.

Like letters designate corresponding parts in all of the figures.

My invention is intended specially for protecting and supporting, when laid upon a support, scales-pans made of porcelain, glass, or enameled metal; but it is also applicable to pans made of papier-maché, perforated and imperforate wood, brass and other metals without enamel.

The invention consists in a metallic rim placed around the edges of the pan and secured thereto in a peculiar manner, as hereinafter specified.

I represent in the drawings a pan for spring-balances, to which the bail is secured by branched ends of the bail passed down through perforations in the pan itself, and held therein by nuts on the lower ends, or other suitable means; but I do not confine myself to any particular construction of the body of the pan.

In the drawings, A represents the pan of the scales or balance, and B the bail thereof, secured in holes $a\ a$ made in the body of the pan. Around the edges of the pan I secure a vertical rim, C, the lower edge, $b$, of which extends downward far enough to protect the bottom of the pan. The rim, which may properly be made of sheet-brass or other sheet metal, is formed to fit closely around the edges of the pan, accurately following the outlines thereof, as shown. In order to secure this rim around the edges of the pan without using any connecting parts or making any perforations in the pan for the purpose, the pan ordinarily, in the case of being made of porcelain or glass, being liable to be broken by such means of attachment, I form an inwardly-projecting bead, $c$, in the rim, in such a position that it will come just under the lower corner of the edge of the pan, as shown in Figs. 3 and 4. This bead is to be of sufficient depth or inward projection to fully sustain the pan above it and prevent the pan from slipping downward in the same. The upper edge, $d$, of the rim is secured over the upper corner of the edge of the pan by swaging it downward over the same, as shown in Figs. 3 and 4. This upper edge of the rim is made high enough, as indicated by dotted lines in Fig. 4, to form sufficient lap over the edge of the pan to prevent the rim from falling off from the pan-body, as best shown by full lines in the same figure. Thus the rim is simply and securely held around the edge of the pan, no very great strength of attachment being required, since the pan is not suspended by the rim.

I claim as my invention—

A pan for scales and balances, provided with a separate rim, C, secured around its edges by a bead, $c$, and inwardly-turned edge $d$, substantially as and for the purpose herein specified.

CHAS. FORSCHNER.

Witnesses:
A. KOERBER,
C. GLENZ.